July 29, 1941.   J. K. MAWHA   2,251,019
COMBUSTION CONTROL SYSTEM
Filed April 5, 1938   2 Sheets-Sheet 1
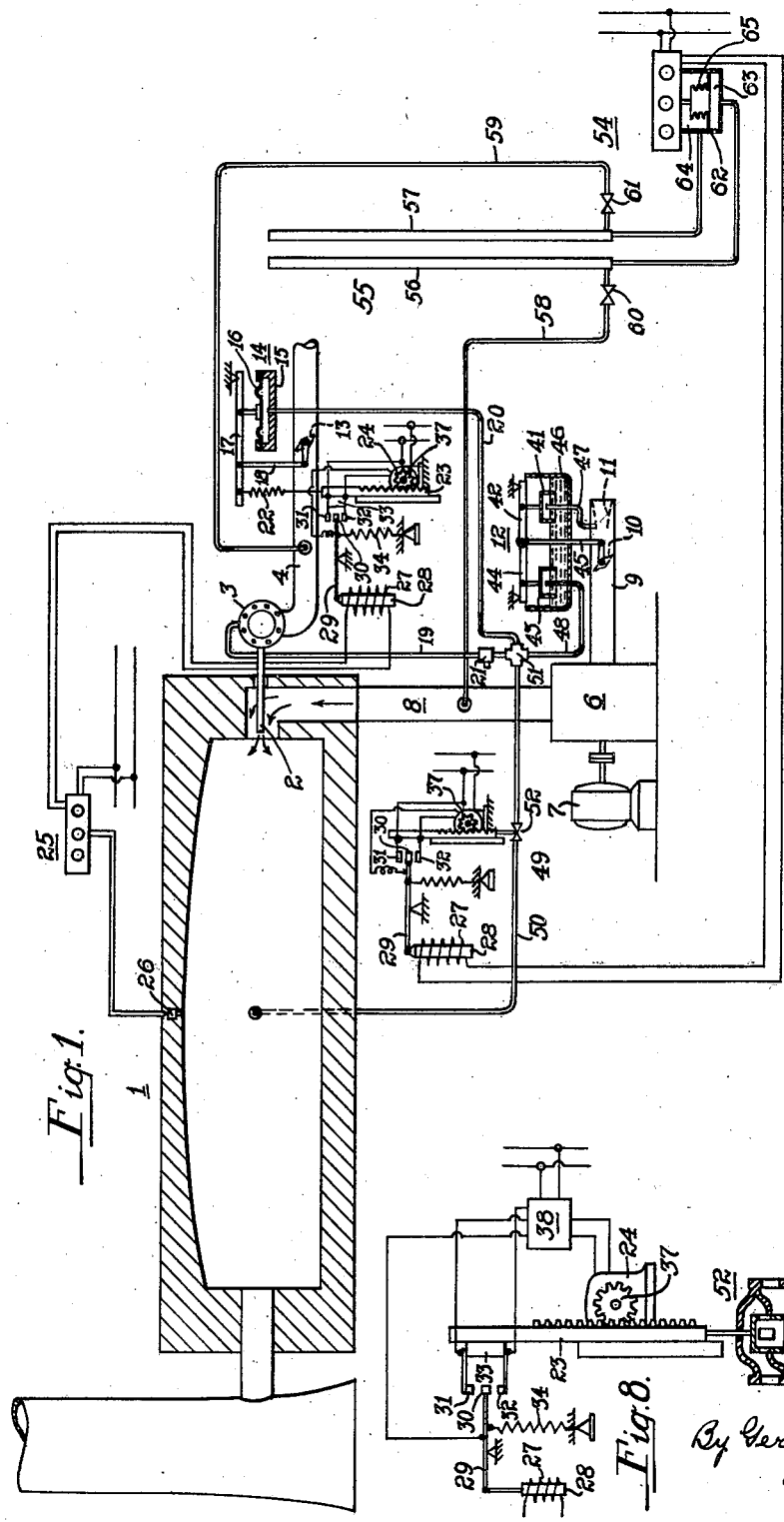
INVENTOR
James K. Mawha
By Gerald B. Tjoflat
His Attorney

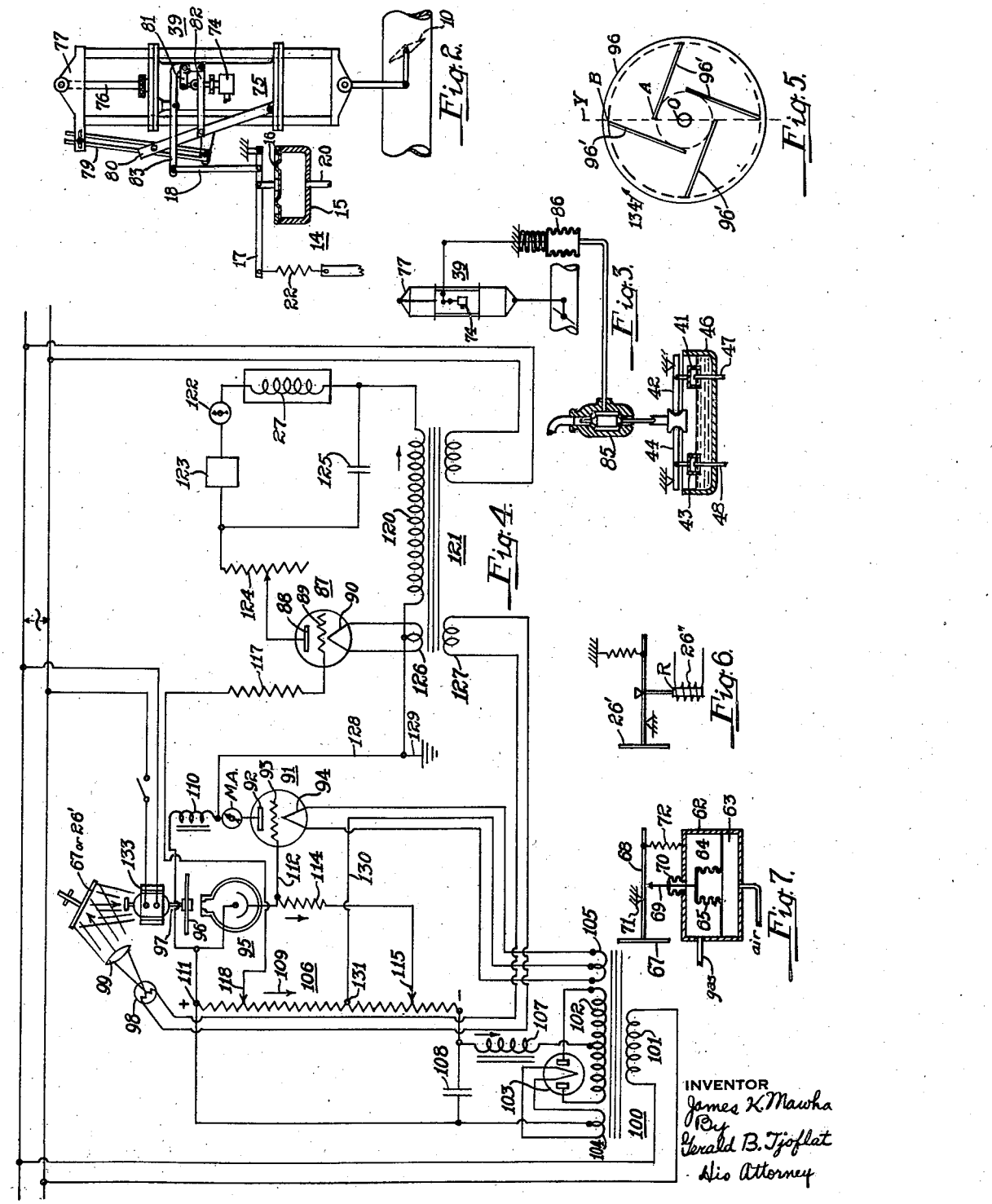

Patented July 29, 1941

2,251,019

UNITED STATES PATENT OFFICE 2,251,019

COMBUSTION CONTROL SYSTEM

James K. Mawha, Pittsburgh, Pa., assignor to John M. Hopwood, Dormont, Pa.

Application April 5, 1938, Serial No. 200,060

8 Claims. (Cl. 236—15)

This invention relates to control systems for regulating the delivery of air and fuel gas to furnaces and more particularly to a system for maintaining a proper mixture of air and fuel gas when the fuel gas consists of a mixture of different gases each having different qualities or heating values.

The control system embodying the invention is particularly adapted to furnaces which are fired with a fuel gas consisting of a mixture of two gases having different qualities or heating values and where such mixture may vary from 100 percent of one of the constituent gases to 100 percent of the other or any proportion therebetween. The system, in one form of the invention, may be utilized to so control the delivery of a combustible mixture of air and fuel gas to a furnace that a constant or uniform temperature is maintained in the furnace, and to so regulate the quantity or rate of air which is supplied to the furnace to support combustion of the fuel gas that it not only bears a definite relation to the rate at which such fuel gas is supplied but also bears a predetermined relation to the variable quality of the fuel gas.

To burn a fuel gas consisting of a mixture of say two fuel gases having different qualities or heating values, it is necessary to vary the gas-air ratio of the combustible mixture in accordance with the quality of the fuel gas mixture, in order to maintain a substantially constant degree of combustion efficiency.

The air required to burn a gaseous fuel at a given efficiency of combustion is proportional to the heating value of the gas. Where a mixed fuel gas is burned and the mixed fuel comprises say two different fuel gases, each having different but constant heating values and different but constant specific gravities, there will be a definite relation between the volumetric heating value of the mixture and the specific gravity thereof. Therefore the amount of air required for a given efficiency of combustion of the mixed fuel gas will be proportional to the specific gravity of the mixture as well as to its volumetric heating value.

An object of this invention is the provision of a control system that will maintain the proper mixture of air and a mixed fuel gas and which will utilize changes in specific gravities of the mixture to modify the amount of air supplied so that a uniform efficiency of combustion may be maintained for all values of the heating quality of the mixed fuel gas.

Another object of this invention is the provision of a system for so controlling the delivery of air and mixed fuel gas to a furnace that such a ratio between air and gas will be maintained as will result in efficient combustion of the fuel gas.

And a further object of the invention is the provision of a system for so regulating the delivery of air and mixed fuel gas to a furnace that a substantially constant or uniform efficiency of combustion may be obtained, and for so modifying the rate of delivery of air and fuel gas as to compensate for variations in quality or heating value of the fuel gas mixture that the same efficiency of combustion is maintained for all proportions of the constituent of fuel gases of the mixed fuel gas.

Other objects of the invention will in part be apparent and will in part be obvious from the folowing description taken in conjunction with the accompanying drawings, in which:

Figure 1 is a more or less diagrammatic view of a control system embodying a form of the invention, as applied to the regulation of the supply of air and a mixed fuel gas to a furnace which is illustrated diagrammatically and in section;

Fig. 2 is a view of a device which regulates the supply of fuel gas to the furnace;

Fig. 3 is a view of a device which regulates the supply of combustion air to the furnace;

Fig. 4 is a more or less schematic illustration of circuits and apparatus for so adjusting the fuel supply regulator in accordance with the temperature existing at some selected point in the furnace that the heat input to the furnace may be regulated to maintain a substantially constant temperature in the furnace, this arrangement except for a slight modification, being also utilized to adjust the rates of air and fuel supply to compensate for variations in heating quality of the mixed gas fuel;

Fig. 5 is a view in front elevation of a rotating disc or screen embodied in the arrangement shown in Fig. 4;

Fig. 6 is a view of an electromagnetically operated reflector or mirror embodied in the apparatus of Fig. 4;

Fig. 7 is a view partly in section, of a reflecting mirror and pressure responsive mechanism for operating the same, which is utilized with apparatus, such as shown in Fig. 4 in place of the device of Fig. 6, to adjust the rate of air supply in response to changes in specific gravity or heating quality of the mixed gas fuel;

Fig. 8 is a view of an electrically controlled motor operated leak-off valve embodied in the control system of Fig. 1; and Fig. 9 is a top plan view of the motor drive for the leak-off valve.

In the drawings, a control system embodying a form of the invention is, for purposes of illustration, shown as applied to a furnace 1 having a series of burners 2 (only one of which is shown) that are connected to a header 3 to which a fuel gas is supplied by a supply pipe 4. The fuel gas delivered to the supply pipe from sources not shown, consists of a mixture of a plurality of different gases, having different but substantially constant heating values or B. t. u. content, and different but substantially constant specific gravities.

The fuel gas delivered to header 3 therefore may be considered as a mixed gas fuel and comprising for example, two gas fuels, such as natural gas and coke oven gas. These gases have substantially uniform but different heating values or B. t. u. content and substantially uniform but different specific gravities. The supply of these constituent gases may vary from one hundred percent of one to one hundred percent of the other. As may be shown later herein, the control system will respond to variations in the proportions of these constituent gas fuels of the mixed fuel gas to effect the proper rate of air supply so as to maintain substantially uniform efficiency of combustion for all variations in quality of the mixed gas.

The air required for the combustion of the mixed fuel gas may, for example, be supplied by a forced draft fan or blower 6 which is driven by a motor 7 and delivered to the burners 2 through a conduit 8. The intake 9 of the fan is provided with a damper 10 and a Venturi throat 11. For a given mixture of mixed fuel gas delivered to the burners, a regulator 12 adjusts damper 10 in such fashion that air will be supplied to the burners at such a rate that a uniform standard of combustion efficiency will be maintained for all rates at which the fuel gas is supplied to the burners. The control system embodies means for so modifying the operation of regulator 12 that the rate of air supply will be adjusted to suit variations in the heating quality of the mixed fuel gas and thereby maintain the efficiency of combustion uniform.

The supply of mixed fuel gas delivered to the header 3 may be controlled by a valve or damper 13 located in supply pipe 4, which is operated by a regulator 14. For a given quality or heating value of the mixed fuel gas and a given furnace temperature, regulator 14 adjusts damper 13 in such manner that the pressure of the gas in the header 3 is maintained substantially constant. In Fig. 1, regulator 14 is illustrated only schematically but is shown in a practical form in Fig. 2. As schematically illustrated, this regulator includes a housing 15 having a diaphragm 16 therein which is connected by a lever 17 and link 18 to damper 13. The pressure of the gas in header 3 is communicated to housing 15 by pipes 19 and 20, an adjustable orifice 21 being disposed in pipe 19. The function of this orifice will be described later herein.

A tension spring 22 is connected at one end to lever 17 and is adjusted to hold the diaphragm in balance with a predetermined value of pressure of gas in the header when the damper is in the proper position to effect such pressure.

If the furnace temperature varies from a desired constant value (assuming that no change in the heating quality of the gas fuel has occurred) requiring an adjustment in the amount of fuel delivered to the furnace, an adjustment is made in the tension of spring 22 (the loading on diaphragm 16) which will result in such an adjustment of damper 13 as is required to change the rate of fuel delivery in the direction required to restore the furnace temperature to the desired value.

The adjustment or change in the loading on diaphragm 16 is accomplished by means of a rack 23 which is connected to spring 22, and driven by a reversible electric motor 24. Motor 24 is under the control of a device 25 having a temperature responsive element 26 such as a thermo-couple disposed in the roof of the furnace or at some other convenient or desired position and a reflecting element 26' which is oscillated by a magnet coil 26" and armature R. Variations in temperature of the thermo-couple are utilized to variably energize coil 26" to control the magnitude of the current output of an electrical system such as shown in Fig. 4 and embodied in device 25. This electrical system may be of the type disclosed in the application of Smith and Specht, Serial No. 704,518, filed December 29, 1933, and assigned to John M. Hopwood. The current output of this system is utilized to energize a solenoid 27 which acts on a movable core or armature 28 that operates a movable member or pointer 29 having a contact member 30 at one end that moves between two contact members 31 and 32. Contact members 31 and 32 are stationary relative to each other but mounted for movement with or by the rack 23. As shown, these contacts are carried by a block 33 secured to rack 23. Movable member 29 is biased to a neutral position or midway position, for a given current output of the system of Fig. 4, by means of an adjustable spring 34.

If the temperature of the furnace is rising, the current output of this system increases so that contact member 31 is engaged by contact member 30 causing motor 24 to be connected to a supply source and turn in such a direction as to move rack 23 upwardly to decrease the tension in spring 22 and thereby effect such an adjustment of regulator 14 that it will operate to maintain a lower pressure in header 3. If the temperature of the furnace is decreasing below the desired value, then movable contact member 30 engages contact member 32 causing the motor to operate in the reverse direction to increase the tension in spring 22. This increased tension increases the loading on regulator 14 so that it will operate to maintain a higher regulated fuel gas pressure in header 3 and a higher rate of combustion in the furnace. By changing the loading on regulator 14 in accordance with the temperature in the furnace, this regulator will so increase or decrease the regulated pressure of the fuel gas that the desired temperature is maintained.

The adjustments in the loading on regulator 14 are made in incremental steps to avoid over-adjustment with consequent over-adjustment in the pressure of the mixed fuel gas in header 3. These step-by-step adjustments of regulator 14 are made because as motor 24 is operated in one direction or the other, the contact members 31 and 32 being carried or moved by rack 23, break contact with the movable contact member 30 when the rack has moved a slight distance.

Therefore, a series of interrupted operations of the motor will occur in either direction until the loading of the diaphragm of regulator 14 has been adjusted to such a value that this regulator will maintain the proper rate of fuel delivery to the furnace for the particular amount of heat-input required.

The drive between motor 24 and rack 23, and the control unit for the motor are indicated more fully in Figs. 8 and 9. A gear reducer 36 is disposed between the motor and a pinion 37 that meshes with the rack and the reduction is one which allows the motor to run at high speed or to make many revolutions while moving the rack slowly or a short distance. The reversing controller for the motor is illustrated schematically at 38 and may be of any well known type.

As stated previously herein, regulator 12 responds to the rate of air flow through the Venturi throat 11 and attempts to maintain the air flow rate constant. This regulator also responds to a pressure in or to a pressure which is a function of the pressure in the mixed fuel gas header 3 so that the rate of air supply may be caused to be in direct proportion to the rate of supply of fuel to the furnace. As illustrated, regulators 12 and 14 are so connected to gas header 3 that they are both subjected to the same magnitude or value of mixed fuel gas pressure.

Regulator 12, as diagrammatically illustrated, operates damper 10 directly, whereas in a practical form of regulator, this regulator controls the operation of a motor such as an hydraulic or air cylinder 39, which in turn is directly coupled to the damper (see Fig. 3).

Referring to Fig. 1, it will be seen that regulator 12 comprises an inverted float 41 which is mounted on a lever arm 42 and an inverted float 43 which is mounted on a lever arm 44, and these arms in turn are connected at their adjacent ends by a link 45 to damper 10. These floats work in a liquid seal of water or oil which is contained in a tank 46. The interior of float 41 is connected by a pipe 47 to the Venturi throat 11 so that it is subjected to the suction created at this point. The interior of float 43 is connected by a pipe 48 to pipes 19 and 20 so that it is subjected to the same magnitude of fuel gas pressure that regulator 14 is. Thus floats 41 and 43 will oppose each other in their action on damper 10 as one float is under pressure and the other under suction. With this form of regulator, it will be seen that when once adjusted to provide the delivery of the proper amount of air to the burners for a given quality and pressure of gas in header 3, the rate of air supply will change with and in proportion to changes in the rate of fuel supply.

If the quality of the mixed fuel gas changes, as where the proportions of constituents of the mixed gas changes, the rate of air supply must be changed to maintain the efficiency of combustion at the desired standard. If the heating value of the gas is decreasing because of a larger proportion of coke oven gas, for example, than of natural gas in the mixed fuel gas, then the rate of air supply must be decreased in proportion to the decrease in the heating quality of the mixed gas. Conversely, if the heating quality is increased by reason of a larger proportion of the gas having the higher heating quality in the mixed fuel gas, the rate of air supply must be increased.

To provide for the adjustment in the operation of the air supply regulator to compensate for changes in the heating quality of the mixed fuel gas, an adjustable leak-off 49 is provided which operates to change the magnitude of the fuel gas pressure acting on regulators 12 and 14. This adjustable leak-off includes a pipe 50 which is connected at one end to pipes 19 and 20, a four-way fitting 51 being provided for this purpose, and a valve 52. The opposite end of pipe 50 may discharge to the atmosphere or, preferably, into the furnace where the escaping gas may be burned. In order to change the fuel gas pressure acting on regulators 12 and 14, to compensate for changes in the heating quality of the mixed fuel gas, valve 52 is adjusted. If this valve is closed, the pressure drop across adjustable orifice 21 will be zero so that the pressure acting on float 43 of regulator 12 and on diaphragm 16 on regulator 14 will be equal to the pressure of the gas in header 3. As valve 52 is opened, mixed fuel gas flows through the leak-off line causing the pressure drop across orifice 21 to rise so that the pressure acting on float 43 of regulator 12 and on regulator 14 will be lower than the pressure in header 3. The more valve 52 is opened the lower this pressure will be, because the drop across the orifice 21 will increase with the increased flow of gas through leak-off line 50.

The lower the heat value of the mixed fuel gas, the more valve 52 is opened, because less air is required to maintain the efficiency of combustion up to the desired standard; conversely, the greater the heat value of the fuel gas becomes, or the more the heating value of this mixed gas approaches the heating value, of the fuel gas constituent having the highest heating value, the more valve 52 will be closed, as more air is required to maintain the desired combustion efficiency.

Valve 52 is adjusted in accordance with variations in the heating quality of the mixed fuel gas delivered to header 3 and since as stated previously herein, the specific gravity of the mixed gas is a measure of the heating value thereof, means 54 are provided for measuring the changes in specific gravity of the gas and causing valve 52 to be adjusted in accordance with such measurements. Valve 52 may be operated by any suitable means, for example, by the rack and motor drive described in connection with the regulator 14 as shown in Figs. 1 and 7. The adjustments of valve 52 either towards open or closed position, are made in incremental steps for reasons already stated.

The control of the motor and rack drive for valve 52 includes an electrical system such as shown in Fig. 4, and a specific gravity measuring device 55 forming a part of means 54 which causes the output current of this system to vary with variations in the specific gravity of the mixed fuel gas in header 3.

Device 55 comprises two pipes 56 and 57 which are relatively tall and which are connected at their lower ends to the air supply conduit 8 and gas header 3 by pipes 58 and 59, respectively, in which needle valves 60 and 61 are disposed. The upper ends of these pipes are open to the atmosphere and the lower ends are connected to a casing 62 which is divided into chambers 63 and 64 by a bellows or flexible diaphragm 65. When these pipes are filled with gas and air respectively, they form columns of air and mixed fuel gas and these columns are connected to the lower and upper chambers 63 and 64, respectively. The needle valves 60 and 61 are adjusted to allow just enough gas and air to flow into pipes 56 and 57 to just keep them full, the excess merely bubbling over the tops thereof.

Since the weight of the air column will be substantially constant, it will therefore maintain a substantially constant pressure in chamber 63 and since the weight of the gas column will vary with changes in the quality of the mixed fuel gas, the diaphragm or bellows 65 will be flexed or displaced in proportion to the difference between the weights of these columns. The bellows and diaphragm are utilized to operate an element 67 (see Fig. 7) which causes the output current of the electrical system, such as shown in Fig. 4, to vary by and in accordance with the variations in the specific gravity of the mixed fuel gas supplied to header 3 and, therefore, in accordance with the variations in the volumetric heat content or heating quality thereof. Element 67 comprises a reflecting mirror which is mounted at the end of a lever 68 supported on a stem 69 carried by bellows 65 and which extends through an opening in the top of casing 62. This opening is sealed with an expansible bellows 70. Lever 68 operates against a fulcrum 71 and is provided with a light spring 72 which yieldingly opposes the rocking force supplied to it by the bellows.

The position of the reflecting mirror, being a measure of the quality of the mixed fuel gas, will control the magnitude or determine the magnitude of the output current of this electrical system. The operation of this system will be described later herein.

A practical form of apparatus for operating damper 13 which controls the pressure of the fuel gas in header 3 is illustrated in Fig. 2. Instead of utilizing diaphragm 16 of regulator 14 to operate directly the damper as shown diagrammatically in Fig. 1, this regulator may be utilized to actuate a pilot valve 74 of the air or hydraulic motor 39, which in turn is directly coupled to the fuel supply damper. Thus small movements of diaphragm 16 may be utilized to obtain large, as well as small, adjustments of the damper. Motor 39 comprises a cylinder 75 having a piston therein from which a piston rod 76 extends through one end of the cylinder. The piston rod carries a frame 77 which is connected to damper 13. The pilot valve 74 controls the admission of compressed air or other motive fluid to either side of the piston and allows such fluid to exhaust from either side, motive fluid exhausting from one side when it is admitted to the other. If the pressure on diaphragm 16 increases, the pilot valve is shifted to admit fluid to the cylinder on the bottom side of the piston so that frame 77 is moved upwardly to shift damper 13 towards closed position to restore the pressure in header 3 to the desired value. If the pressure is decreasing the diaphragm 16 moves pilot valve 74 in the opposite direction to admit motive fluid to the top of the cylinder and cause the piston and frame to move downwardly and shift the damper 13 towards open position to increase the pressure in the header towards the desired value. The fluid motor 39 includes a cut-off mechanism that is operated by the regulator frame to return the pilot valve to off position when the frame has traveled a predetermined distance, depending on the amount the valve was opened. This mechanism comprises a cam bar 79, follower lever 80, bell crank 81 and a link 82 which connects the cam bar to the bell crank, and all connected as shown and which cooperate to return the pilot valve to off position as just stated. The valve is initially operated to one or the other of its on positions by a lever 83 which carries the bell crank 81 at one end and is connected at its other end to diaphragm 16 by link 18. Thus, step-by-step movement or adjustment of the damper is obtained. Since construction and operation of this motor is well known in the art and illustrated in prior patents, of which Patent No. 1,931,906, dated Oct. 24, 1933, is an example, it is believed unnecessary to further describe this device herein.

In Fig. 3, a practical form of regulator is shown for operating the air supply regulating damper 10. Instead of operating the damper directly by the dual float regulator 12, this float regulator is employed to operate an escapement valve 85 which controls the delivery of an operating medium such as compressed air to a spring loaded bellows 86 that operates a pilot valve 74 of motor 39, like motor 39 shown in Fig. 2. When the heat content of the mixed fuel gas is decreasing so that a higher rate of gas supply is needed for combustion, escapement valve 85 is so operated by the dual float regulator as to deliver decreasing pressures to bellows 86 causing the frame to move downwardly step by step to shift the air control damper towards open position. If the heat content of the mixed fuel gas is increasing, increasing pressure impulses are delivered by valve 85 to bellows 86 to cause frame 77 to move upwardly step by step and shift the damper towards closed position and decrease the rate of air supply.

The construction and operation of this escapement valve is well known in the art, being shown in Patent No. 1,931,906 granted October 24, 1933, above mentioned as well as in other prior art patents, and needs no further description herein.

The electrical system shown in Fig. 4 and which is employed in the temperature measuring gage 25 and in the specific gravity gage 54 includes a grid controlled glow discharge tube 87, having a plate 88, a grid 89 and a filament 90, an amplifying tube 91 having a plate 92, a grid 93, and filament 94, and a photoelectric cell 95 also connected in circuit with each other that the photoelectric cell controls the flow of current in the plate circuit of tube 91 and this tube in turn controls the grid of tube 87 and the flow of current in its plate circuit.

The photoelectric cell 95 is caused to pass current at such times that the current output of device 87 will be in proportion to the temperature of the furnace or in proportion to the specific gravity of the mixed fuel gas. The photoelectric cell is controlled by a rotating screen or disc 96 having slots 96' therein and by a beam of light 97 which is reflected from mirror 67 or 26' and oscillated along a diameter of the disc, say the vertical diameter, in accordance with the temperature changes in the furnace, or in accordance with the specific gravity of the mixed fuel gas. The reflected light beam is obtained from a light source 98 that shines through a lens 99 onto the mirror.

The power for operating the photo-cell 95 and amplifier tube 91 may be supplied by means of a power pack 100 comprising a transformer having a primary winding 101, a secondary winding 102 to which a thermionic rectifier 103 is connected, and low voltage windings 104 and 105 for supplying the filaments of the rectifier and amplifier tubes, respectively. The output of the rectifier is passed through a potentiometer 106 and a filter comprising a choke coil 107 and condenser 108. The current delivered through potentiometer 106 is unidirectional and flows in the direction indicated by the arrow 109. The voltage drop across the potentiometer provides the direct current voltages supplied to photoelectric cell and to the plate and grid circuits of the amplifying tube, and the grid of the glow tube 87.

The plate or anode 92 of tube 91 is connected through an impedance 110 to positive terminal 111 of the potentiometer as is the anode of the photoelectric cell 95. The cathode of photo-cell 95 is connected by a conductor 112 to the grid of tube 91 and these in turn are connected by a resistor 114 of high ohmic resistance and a sliding contact 115 to the negative portion of the potentiometer.

The grid of glow tube 87 is connected through a protective resistor 117 and a sliding contact 118 to section 119 of potentiometer 106. The sliding contact is so adjusted that the grid bias is normally such that no current will flow in the plate circuit of tube 87 when the plate circuit voltage is applied. If the photoelectric cell 95 is energized, in a manner to be hereinafter described, to cause the amplifying tube to pass current, then a rapidly rising or steep wave front voltage will be developed in impedance 110 which will render the grid of the glow tube 87 sufficiently positive to make the tube pass current at any instant during the application of the positive cycles of the voltage applied to its plate circuit.

The voltage for the plate circuit of the tube 87 is supplied by a secondary winding 120 of a transformer 121 in which circuit solenoid 27 is connected. A milliammeter 122 calibrated in terms of temperature, or in terms of specific gravity of the mixed fuel gas, and a recording instrument 123 suitably calibrated may be included in the plate circuit. An adjustable resistor 124 connected in the plate circuit may be utilized to limit the current output of the tube to a predetermined maximum value, and a condenser 125 may be connected across the instrument and solenoid to smoothen the current flow in this circuit. Transformer 121 includes a low voltage winding 126 which supplies filament 90, and a winding 127 to which light 98 is connected. The neutral point of winding 126 is connected by a conductor 128 to the terminal of impedance 110 which is connected to plate 92 of tube 91 and this conductor in turn is grounded at 129. Since the neutral point of winding 105 is connected by a conductor 130 to potentiometer 106, whereby point 131 of the potentiometer becomes in effect the zero potential point.

Since alternating current voltage is connected to the plate circuit of tube 87, this tube will pass current only during the positive half cycles of this voltage provided the grid bias voltage is of the proper magnitude and polarity.

As previously stated herein, the grid bias on tube 87 is normally adjusted so that no current will flow in the plate circuit of this tube. This adjustment is made while the photo cell 95 is de-energized, by moving sliding contact 118 towards neutral point 131 until the glow tube is just at the critical break-down point, that is, just at the verge of passing current. The slider is then moved further towards the neutral point until the negative bias has been increased a predetermined amount, say ten percent or more if necessary.

The energization of the photoelectric cell is effected by the light beam which is reflected from mirror 67 to the rotating screen 96 in such fashion that for each position of the light beam in its travel between limits A and B on radius O—Y of the screen, the glow tube will break down and pass current at a different but definite point in the positive half cycle of the alternating current plate voltage; and these break-down points will correspond to different values of furnace temperature or of specific gravity of the mixed fuel gas.

In order that the time of impingement of the light beam on the photoelectric cell may be caused to occur only during the times that the plate voltage of tube 87 is positive, disc 96 is driven by a synchronous motor 133 and slots 96' are spaced 180 electrical degrees apart. Since motor 133 is operating in synchronism with the plate voltage, these slots are so proportioned that every other slot sweeps across radius O—Y during the time that the plate voltage is positive. In other words, if 60 cycle alternating current voltage is applied to the plate circuit of tube 87, then disc 96 should travel at such speed that each slot 96' for example, would sweep across radius O—Y (the path of travel of the light beam) in 1/120 of a second.

If the light beam is impinging on disc 96 at a point where it will shine through the outer end of slots 96' (assuming that disc 96 is rotating in the direction of arrow 134) then the photoelectric cell 95 will be momentarily energized and cause current to flow in the plate circuit of tube 91. This flow of current induces an abruptly rising voltage in impedance 110 that neutralizes the normal negative bias voltage on the grid of tube 87 and imposes thereon instead a positive bias voltage of sufficient magnitude that the glow tube will break down at the beginning of the positive half wave of the plate voltage and pass current for the full half cycle. When the light beam is impinging on the disc at a point where it will pass through the outer end of the slots 96', the glow tube will pass maximum current. If the light beam impinges on the disc at any point within limits A and B, the glow tube will break down later in the positive half cycles of the plate voltage so that the current output of this tube will be proportionately less and will be a minimum when the light beam shines through the inner ends of the slot.

If the disc is driven by a consequent pole type alternating current motor which, in effect, is an induction motor capable of operating at synchronous speed, as many slots as the motor has poles are required. Thus, if a four pole motor is employed, the disc will have four slots as shown, and these slots will be spaced 180 electrical degrees apart so that when the motor is started and brought up to synchronous speed, there will always be a pair of slots disposed 180 electrical degrees apart through which the light beam may shine in the proper phase relation to the plate voltage of tube 87. Therefore, the steep wave front or abruptly rising voltages impressed on the grid of device 87 will always be in phase with and occur at some time during the positive half cycles of the alternating voltage of this device.

If a salient pole motor is utilized and provided with direct current field windings, only half the number of slots required for a consequent pole motor would be necessary. These slots, of course, would be 180 electrical degrees apart and separated by solid sections of disc, each embracing an angle of 180 electrical degrees.

By giving the slots in disc 96 a shape corresponding to the graph characteristics of the variable being measured or controlled, for example, the temperature of the furnace, or the specific gravity of the mixed fuel gas, the output current of the glow discharge device will have the same graph characteristics as the variable. Thus, if it is desired that there shall be a linear relation between the pressure acting on the bellows of the specific gravity gage, or the temperature to which thermo-couple 26 is subjected, and the output current of the glow discharge devices associated with these gages, the leading edges of slots 96' in the disc may be given shapes that accord with the equation $$\rho = R(R1-R)\left(\frac{1-\cos\theta}{2}\right)$$

where $\rho$ is the polar radius; R is the radius of the circle which is tangent to the inner ends of these slots; R1 is the radius of the circle which is tangent to the other ends of these slots and $\theta$ is the angle in electrical degrees.

From this equation it will be apparent that the current output of the glow discharge devices used with the temperature and specific gravity gages may, for example, be caused to vary either as the square, cube, square root or any other exponential function of the specific gravity of the mixed fuel gas or of the temperature of the furnace as measured by the thermo-couple.

While but one form of the invention has been shown and described herein, it will be apparent to those skilled in this particular art that various modifications and changes may be made without departing either from the spirit or the scope of the invention. It is desired therefore that only such limitations shall be placed on the invention as are imposed by the prior art and the appended claims.

What I claim as new and desire to secure by Letters Patent is:

1. In a control system for furnaces, a source of supply of fuel gas comprising a mixture of gases having different B. t. u. values, a regulator adjusted to maintain the rate at which such mixture is delivered to the furnace substantially constant for a given mixture of such gases, means responsive to a departure in furnace temperature from a predetermined value for so changing the adjustment of said regulator as to effect such a change in the rate at which the fuel gas is delivered to the furnace as to restore the furnace temperature to said predetermined value, a source of air supply for the furnace, means responsive to the rate of delivery of air and fuel gas to the furnace for maintaining a substantially constant ratio between such rates of delivery for a given mixture of fuel gas, and means responsive to the relative weights of the air and fuel gas delivered to the furnace and acting upon said fuel supply regulator and said fuel-air ratio responsive means for automatically modifying the fuel gas and air ratio in such direction as to maintain efficient combustion in the furnace.

2. In a control system for furnaces fired with a mixed fuel gas, the constituent gases of which have different volumetric heating values and different but substantially constant specific gravities, and provided with a source of air supply, a regulator having means for adjusting it to control the mixed fuel gas at a substantially constant delivery rate for a given demand for heat, means responsive to the rates at which the mixed fuel gas and air are delivered to the furnace for so adjusting the air supply as to maintain the efficiency of combustion substantially constant for a given heating quality of the mixed fuel gas, and means responsive to a change in the specific gravities of the air and the mixed fuel gas and acting upon said mixed fuel gas regulator and the air supply adjusting means to so readjust the rates of delivery of air and gas that the efficiency of combustion is not substantially altered.

3. In a control system for furnaces fired with a mixed fuel gas, the constituent gases of which have different volumetric heating values and different but substantially constant specific gravities, and provided with a source of air supply, a regulator having means for adjusting it to control the mixed fuel gas at a substantially constant delivery rate for a given demand for heat, means responsive to the rates at which the mixed fuel gas and air are delivered to the furnace for so adjusting the air supply as to maintain the efficiency of combustion substantially constant for a given heating quality of the mixed fuel gas, means responsive to a change in the specific gravities of the air and the mixed fuel gas and acting upon the gas regulator and the air supply control means to so readjust the rates of delivery of air and gas that the efficiency of combustion is not substantially altered, and means responsive to a change in furnace temperature, as affected by a change in the demand for heat, for modifying the adjustment of the fuel supply regulator and causing it to regulate the fuel supply at a rate which will restore the furnace temperature to a value corresponding to the demand for heat.

4. In a control system for furnaces fired with a mixed fuel gas, the constituent gases of which have different volumetric heating values and different but substantially constant specific gravities, and provided with a source of air supply, a regulator having means for adjusting it to control the mixed fuel gas at a substantially constant delivery rate for a given demand for heat, means responsive to the rates at which the mixed fuel gas and air are delivered to the furnace for so adjusting the air supply as to maintain the efficiency of combustion substantially constant for a given heating quality of the mixed fuel gas, and means responsive to the difference between the specific gravity of the mixed fuel gas and the air delivered to the furnace for effecting such adjustments in the operation of the gas rate regulator and the air-gas ratio regulator that the rates of air and fuel delivery are so modified that the efficiency of combustion is maintained at a substantially constant value for substantially all values of heating quality of the mixed fuel gas.

5. In a control system for furnaces fired with a mixed fuel gas, the constituent gases of which have different volumetric heating values and different but substantially constant specific gravities and provided with a source of air supply, a regulator having means for adjusting it to control the mixed fuel gas at a substantially constant delivery rate for a given demand for heat, means responsive to the rates at which the mixed fuel gas and air are delivered to the furnace for so adjusting the air supply as to maintain the efficiency of combustion substantially constant for a given heating quality of the mixed fuel gas, and means responsive to the difference between the specific gravities of the mixed fuel gas and the air for effecting such adjustments in the operation of said gas and gas-air ratio regulators that the rates of air and fuel delivery will be so modified that the efficiency of combustion is maintained at a substantially constant value for substantially all values of heating quality of the mixed fuel gas, and means responsive to changes in furnace temperature for modifying the adjustment of the fuel supply regulator and causing it to regulate the fuel gas delivery rate at a value which will restore the furnace temperature to a predetermined value.

6. In a control system for furnaces provided with a source of air supply and a header having burners connected thereto to which a mixed fuel gas is delivered, a regulator for operating a member controlling the fuel supply rate and having a pressure responsive control element for controlling the regulator, a regulator for operating an element controlling the air supply rate and having a pressure responsive element connected with the air supply and operated in accordance with the rate of air delivery to the furnace, and a pressure element actuated by fuel gas pressure, both said air and gas responsive elements operating to jointly control the air supply regulator to cause the air supply rate to vary by and in accordance with the gas supply rate for a given heating quality of the mixed gas fuel, a pipe connected to the fuel gas supply header, an orifice in said pipe, a second pipe connected through said orifice to said first mentioned pipe and to the pressure element of the fuel supply regulator and a pipe connected from said second pipe to the gas pressure responsive element of the air supply regulator, a leak-off line connected to said second pipe for varying the pressures acting on the gas pressure responsive elements of said regulators, and means for adjusting the rate of leak-off to compensate for changes in the heating quality of the mixed gas so that the rates of air and fuel supply will be properly proportioned for any value of heating quality of said mixed gas fuel.

7. In a control system for furnaces provided with a source of air supply and a header having burners connected thereto to which a mixed fuel gas is delivered, a regulator for operating a member controlling the fuel supply rate and having a pressure responsive control element for controlling the regulator, a regulator for operating an element controlling the air supply rate and having a pressure responsive element connected with the air supply and operated in accordance with the rate of air delivery to the furnace, and a pressure element actuated by fuel gas pressure, both said air and gas responsive elements operating to jointly control the air supply regulator to cause the air supply rate to vary by and in accordance with the gas supply rate for a given heating quality of the mixed gas fuel, a pipe connected to the fuel gas supply header, an orifice in said pipe, a second pipe connected through said orifice to said first mentioned pipe and to the pressure element of the fuel supply regulator and a pipe connected from said second pipe to the gas pressure responsive element of the air supply regulator, a leak-off line connected to said second pipe for varying the pressures acting on the gas pressure responsive elements of said regulators, means for adjusting the rate of leak-off to compensate for changes in the heating quality of the mixed gas so that the rates of air and fuel supply will be properly proportioned for any value of heating quality of said mixed gas fuel, and means responsive to changes in furnace temperature and operative on the fuel supply rate regulator to cause said regulator to change the controlled rate of fuel delivery by an amount sufficient to maintain a given temperature in the furnace.

8. In a control system for furnaces provided with a source of air supply and a header having burners connected thereto to which a mixed fuel gas is delivered, a regulator for operating a member controlling the fuel supply rate and having a pressure responsive control element for controlling the regulator, a regulator for operating an element controlling the air supply rate and having a pressure responsive element connected with the air supply and operated in accordance with the rate of air delivery to the furnace, and a pressure element actuated by fuel gas pressure, both said air and gas responsive elements operating to jointly control the air supply regulator to cause the air supply rate to vary by and in accordance with the gas supply rate for a given heating quality of the mixed gas fuel, a pipe connected to the fuel gas supply header, an orifice in said pipe, a second pipe connected through said orifice to said first mentioned pipe and to the pressure element of the fuel supply regulator and a pipe connected from said second pipe to the gas pressure responsive element of the air supply regulator, a leak-off line connected to said second pipe for varying the pressures acting on the gas pressure responsive elements of said regulators, means for varying the rate of leak-off through said line, and means responsive to changes in specific gravity of the mixed fuel gas for operating said leak-off varying means in accordance with said changes so that the operation of the air and fuel supply regulators will be modified to effect proportionate changes in the rates of supply of air and mixed fuel gas.

JAMES K. MAWHA.